(12) United States Patent
Khan et al.

(10) Patent No.: US 6,172,720 B1
(45) Date of Patent: Jan. 9, 2001

(54) LOW VISCOSITY LIQUID CRYSTAL MATERIAL

(75) Inventors: Asad Aziz Khan, Kent; Stanley Joseph Laskos, Jr., Diamond; Michael E. Stefanov, Stow, all of OH (US)

(73) Assignee: Kent Displays Incorporated, Kent, OH (US)

( * ) Notice: Under 35 U.S.C. 154(b), the term of this patent shall be extended for 0 days.

(21) Appl. No.: 08/862,561

(22) Filed: May 23, 1997

(51) Int. Cl.[7] ............................. G02F 1/133; G02F 1/137; C09K 19/54; C09K 19/30

(52) U.S. Cl. ................ 349/35; 252/299.5; 252/299.61; 349/36; 349/176; 349/182

(58) Field of Search ........................... 252/299.4, 299.5, 252/299.63; 349/35, 36, 176, 182

(56) References Cited

U.S. PATENT DOCUMENTS

| | | | |
|---|---|---|---|
| 3,600,060 | 8/1971 | Churchill et al. | 349/21 |
| 3,697,150 | 10/1972 | Wysocki | 349/33 |
| 3,790,251 | 2/1974 | Wysocki et al. | 349/34 |
| 3,816,786 | 6/1974 | Churchill et al. | 313/400 |
| 3,938,880 | 2/1976 | Haas et al. | 349/169 |
| 4,118,335 | 10/1978 | Krause et al. | |
| 4,278,328 | 7/1981 | Mukoh et al. | 349/130 |
| 4,323,472 | 4/1982 | Sethofer . | |
| 4,422,951 | 12/1983 | Sugimori et al. | |
| 4,507,222 | 3/1985 | Inoue et al. | |
| 4,522,470 | 6/1985 | Iijima | 349/186 |
| 4,528,116 | 7/1985 | Dabrowski et al. | |
| 4,544,497 | 10/1985 | Abdullah et al. | 252/299.5 |

(List continued on next page.)

FOREIGN PATENT DOCUMENTS 60-28952 * 2/1985 (JP) .

OTHER PUBLICATIONS

WPIDS 85–077300, 1985.*
S.M. Kelly et al., 2-(4-Alkylphenyl)-5-(alkenyloxy)pyrimidines: synthesis, liquid crystal transition temperatures and some physical properties, pp. 813–829 (1994).
M. Schadt and F. Muller, "Influence of solutes on material constants of liquid crystals and on electro–optical properties of twisted nematic displays", The Journal of Chemical Physics, vol. 65, No. 6, pp. 2224–2230 (1976).
M. Schadt, "Solute–induced transmission changes in liquid crystal twist cells", Physics Letters, vol. 57A, No. 5 (1976).
D.E. Martire et al., "The effect of quasispherical solutes on the nematic to .isotropic transition in liquid crystals", The Journal of Chemical Physics, vol. 64, No. 4 (1976).
Ch. Gahwiller, "The Viscosity Coefficients of a Room–Temperature Liquid Crystal (MBBA)", Physics Letters, vol. 66A, No. 4, pp. 311–312 (1971).

(List continued on next page.)

* cited by examiner

Primary Examiner—Shean C. Wu
(74) Attorney, Agent, or Firm—Watts Hoffman Fisher & Heinke (57) ABSTRACT

A liquid crystal material for a display device includes a first chiral nematic liquid crystal component and a second component that exhibits no liquid crystalline phase at any temperature. The second component is present in an amount effective to reduce the bulk viscosity of the liquid crystal material by at least about 26% at room temperature or is present in an amount of at least about 5% by weight based upon the total weight of the liquid crystal material. The liquid crystal material may have a positive dielectric anisotropy. The second component may have a molecular weight not exceeding 205 grams/mole. Embodiments relate to a display device comprising the present material. Another aspect includes a method of increasing the switching speed in a display that employs the present material.

56 Claims, 4 Drawing Sheets

U.S. PATENT DOCUMENTS

| | | |
|---|---|---|
| 4,548,731 | 10/1985 | Sugimori et al. . |
| 4,564,694 | 1/1986 | Hirai et al. . |
| 4,650,836 | 3/1987 | George et al. . |
| 4,695,398 | 9/1987 | Goto et al. . |
| 4,704,228 | 11/1987 | Inoue et al. . |
| 4,729,639 | 3/1988 | Hubbard . |
| 4,778,620 | 10/1988 | Goto et al. . |
| 4,846,999 | 7/1989 | Kizaki . |
| 4,874,543 | 10/1989 | Yoshida . |
| 4,917,819 | 4/1990 | Goto et al. . |
| 4,994,204 | 2/1991 | Doane et al. . |
| 5,046,830 | 9/1991 | Nakanowatari ............... 349/172 |
| 5,182,664 | 1/1993 | Clere ............................ 349/33 |
| 5,198,149 | 3/1993 | Reiffenrath et al. . |
| 5,251,048 | 10/1993 | Doane et al. . |
| 5,271,865 | 12/1993 | Hittich et al. . |
| 5,293,261 | 3/1994 | Shashidhar et al. ............ 349/183 |
| 5,315,419 | 5/1994 | Saupe et al. . |
| 5,348,685 | 9/1994 | Mohcizuki et al. . |
| 5,354,489 | 10/1994 | Inoue et al. . |
| 5,354,496 | 10/1994 | Elliott . |
| 5,370,819 | 12/1994 | Fujita et al. . |
| 5,418,281 | 5/1995 | Yung et al. . |
| 5,422,033 | 6/1995 | Mochizuki et al. ........... 252/299.01 |
| 5,434,685 | 7/1995 | Pirs et al. . |
| 5,437,811 | 8/1995 | Doane et al. . |
| 5,468,421 | 11/1995 | Matsui et al. . |
| 5,554,316 | 9/1996 | Fujita et al. . |
| 5,661,533 | 8/1997 | Wu et al. ....................... 349/169 |

OTHER PUBLICATIONS

W. Helfrich, "Capillary Flow of Cholesteric and Smectic Liquid Crystals", Physical Review Letters, vol. 23, No. 7, pp. 372–374 (1969).

L.C. Chow, D.E. Martire, "Thermodynamics of Solutions with Liquid Crystal Solvents IV. GLC Determination of the Degree of Order in a Nematic Mesophase", Third International Liquid Crystal Liquid Crystal Conference in Berlin, pp. 293–306 (1970).

P.E. Cladis et al., "Binary Mixtures of Rod–like Molecules with p–Methoxybenzylidene–p–n–Autylanine", Third International Liquid Crystal Conference in Berlin, pp. 1–8 (1970).

H. Pruecher, et al., "Physical Properties of Liquid Crystals: VII. Viscosities of Nematic Liquid Crystal Materials", The Merck Group Liquid Crystal Newsletter, vol. 8, pp. 24–29 (1991).

"Thermotropic Liquid Crystals" Gray et al. pp. 31–38, 1987.*

Hikmet, R.A.M., "Structure of Cholesteric Gels and Their Electrically Induced Light Scattering and Colour Changes", Liquid Crystals, vol. 12, No. 2, pp. 319–336 (1992).

Haas, Liquid Crystal Display Research: "The First Fifteen Years" Mol. Cryst. Liq. Cryst., vol. 94, pp. 1–31 (1983).

Kahn et al., "Surface–Produced Alignment of Liquid Crystals" Proceedings of the IEEE, vol. 61, pp. 823–828 (1973).

Yang et al., "Cholesteric Reflective Display: Drive Scheme and Contrast" Applied Physics Letters, vol. 64, No. 15, pp. 1905–1907 (1994).

Haas, "Electric Field Effects on the System OleylCholesteryl Carbonate–Cholesteryl Chloride", J. Electrochem, vol. 118, pp. 1372 (1971).

SESSIONSEC and FB, "Crystal Structure and Lattice Parameters", Bull American Physical Society, vol. 14, No. 6, pp. 739–740 (1969).

Kreuzer et al., "Cyclic Silizanes with Mesogenic Side Groups", Mol. Cryst. Liq. Cryst., vol. 199, pp. 345–378 (1991).

Haas et al., "Interaction Between UV Radiation and Cholesteric Liquid Crystals, Molecular Crystals and Liquid Crystals", vol. 7, pp. 371–379 (1969).

Haas, W., and Adams, J.E., "New optical storage mode in liquid crystals," Applied Physics Letters, vol. 25, No. 10., pp. 535–537 (1974).

M. Pfeiffer et al., "Design of PSCT Materials for MIM Addressing", SID 94 Digest, pp. 837–840 (1994).

Zvi Yaniv, "Reflective Cholesteric Displays", Information Display, pp. 10–13 (1995).

P.G. de Gennes, "Cholesterics, The Physics of Liquid Crystals", pp. 280–289 (1993).

Z.J. Lu et al., "Surface Modified Reflective Cholesteric Displays".

J.W. Doan, "Invited Reflective Cholesteric Displays", Asia Display, pp. 47–50 (1995).

W.D. St John, "Surface and Polymer Network Stabilized Reflective Cholesteric Liquid Crystal Displays", Optical Engineering Midwest Program (1995).

W.D. St. John et al, "Characterization of Reflective Cholesteroid Liquid Crystal Displays", J. Appl. Phys. 78(9) pp. 5253–5265 (1995).

A. Takada, "Columnar Liquid Crystals in Oligosuccharide derivatives", Liquid Crystals, vo. 12, No. 2 (1992).

LOW VISCOSITY LIQUID CRYSTAL MATERIAL

This application was made in part with Government support under cooperative agreement numbers NG 1331-94C-0042 and NG1331-96C-0042 awarded by the Defense Advanced Research Projects Agency (DARPA). The Government has certain rights in this invention.

FIELD OF THE INVENTION

The present invention is directed to a chiral nematic liquid crystal material for use in a display device and includes an additive that lowers the viscosity of the material.

BACKGROUND OF THE INVENTION

Stabilized cholesteric liquid crystals have high viscosity due to the presence of a large amount of chiral dopants and a corresponding strong twisting nature inherent in the chiral material. High viscosity, however, can undesirably increase the response time of these materials when used in electrooptic devices.

Materials have been added to nematic liquid crystals for reducing their viscosity. Nematic liquid crystal materials have drastically different properties than cholesteric liquid crystal materials. For example, cholesteric materials exhibit weakly scattering focal conic and reflecting twisted planar states which are stable in the absence of a field. One cannot predict the effect that additives for lowering the viscosity of nematic liquid crystals may have in a chiral nematic liquid crystal material.

The textures of chiral nematic materials make predicting their behavior difficult compared to nematics. The liquid crystal molecules of chiral nematic materials have directors that are helically oriented, which makes it difficult to conduct experiments such as measurements of dielectric constant and transmission. In view of the difficulty in measuring properties of cholesteric liquid crystal materials and the unpredictability in formulating compositions of such materials, the need remains for additives that can lower the viscosity of a chiral nematic liquid crystal material for use in a display device.

SUMMARY OF THE INVENTION

The present invention is directed in general to a liquid crystal material for a display device which comprises a first chiral nematic liquid crystal component and a second component that exhibits no liquid crystalline phase at any temperature. The second component is present in an amount effective to reduce the bulk viscosity of the material at room temperature by at least about 26% and, more preferably, by at least about 46%. Alternatively, the second component, which substantially lowers the viscosity of the liquid crystal material, is used in an amount of at least about 5% by weight based upon the total weight of the liquid crystal material and, more preferably, in an amount of at least about 10% by weight. The material preferably has positive dielectric anisotropy. Display devices that include the present material exhibit greatly improved properties including higher contrast ratios, shorter pulse widths and lower voltages.

In particular, the second component is achiral and has a molecular weight not exceeding about 205 grams/mole. The material has a bulk viscosity that is less than about 82 centipoise, which may be obtained using the second component in an amount of at least about 10% by weight based upon the total weight of the material. The second component is preferably used in an amount ranging from about 5 to about 20% by weight based upon the total weight of the material and, more preferably, in an amount ranging from greater than 8% to about 15% by weight. Amounts of all chemical components herein are in % by weight based upon the total weight of the liquid crystal material, unless otherwise indicated.

A preferred embodiment of the present invention is directed to a display device comprising a liquid crystal material including the first chiral nematic liquid crystal component and the second component which exhibits no liquid crystalline phase at any temperature. The second component reduces the bulk viscosity of the material by at least about 26%. Cell wall structure cooperates with the material to form focal conic and twisted planar textures that are stable in the absence of a field. A device applies an electric field for transforming at least a portion of the material to at least one of the focal conic and twisted planar textures. The display device has a monochromatic reflective contrast ratio of at least about 30:1. The device for applying an electric field may transform the material to a homeotropic state by applying a pulse of a width less than about 6 milliseconds and a voltage not greater than about 45 volts. The display is preferably operated in a reflective mode using frontlighting.

As used in this disclosure, a pulse train is applied to the liquid crystal material, the pulse train comprising at least one AC pulse generated while the voltage is on. A pulse is defined in this disclosure as one period of an electromagnetic wave. The pulses that are used in the present invention are preferably square wave pulses. The pulse width referred to herein refers to the width of the entire pulse train.

Consequently, a liquid crystal display device having a chiral nematic material without the second component of the invention may be addressed by applying a pulse of a given voltage and width $PW_{std}$ effective to transform the material to a homeotropic state. A method of the invention for increasing switching speed employs the inventive liquid crystal material including the first chiral nematic liquid crystal component and the second component that exhibits no liquid crystalline phase at any temperature. The liquid crystal material cooperates with the cell wall structure to form focal conic and twisted planar textures that are stable in the absence of a field. The second component is present in an amount effective to transform the liquid crystal to the homeotropic state with a pulse width $PW_{imp}$ that is at least about 50% less than the pulse width $PW_{std}$ at the given voltage.

In particular, the second component is preferably present in an amount greater than 8% by weight based upon the total weight of the material and, more preferably, in an amount of at least 10% by weight. The pulse width $PW_{std}$ may be about 15 milliseconds. In contrast, the pulse width $PW_{imp}$ attained according to the present invention is preferably not greater than about 6 milliseconds and even not greater than about 4 milliseconds. The pulse width $PW_{imp}$ is preferably at least about 70% less than the pulse width $PW_{std}$.

The second component for lowering the viscosity of the material may be comprised of a compound having the following general formula I:

I.

wherein R₁ is selected from the group consisting of an alkyl group and an alkoxy group each having from 1 to 9 carbon atoms.

More preferably, the second component of formula I may have the following formula:

wherein A comprises any group that renders the second component polar and soluble in the first component. In this regard, group A preferably comprises a cyano group. When group A is a cyano group the alkyl or alkoxy group of R₁ preferably does not have seven carbon atoms. If group A is a cyano group and the alkyl or alkoxy group of R₁ has seven carbon atoms, the second component is preferably present in an amount of greater than 10% by weight based upon the total weight of the liquid crystal material.

Preferred substituted phenyl compounds that satisfy the general formula I comprise the following: 1-phenylpentane, 1-phenylhexane, 1-cyclohexylbenzene, p-cyanopentylbenzene, and 4-phenylbutyronitrile.

Alternatively, the second component for lowering the viscosity of the material may be comprised of a compound having the following formula II:

$R_2$—B    II.

wherein $R_2$ is selected from the group consisting of an alkyl group and an alkoxy group each having from 1 to 11 carbon atoms and B comprises any group that renders the second component polar and soluble in the first chiral nematic liquid crystal component. A preferred second component having a formula that satisfies formula II is undecyl cyanide.

The second component in the case of both formulas I and II preferably has a molecular weight not exceeding about 205 grams/mole. Groups A and B are selected from the group consisting of an alkyl group, an alkoxy group and a cyano group.

The viscosity lowering additive of formula I is preferably comprised of a monocyclic aromatic compound such as benzene. However, those skilled in the art would appreciate in view of this disclosure that the viscosity lowering additive may comprise other aromatic compounds. For example, the viscosity lowering additive may comprise a heterocyclic compound. In this regard, nitrogen heterocyclic compounds (e.g., pyridine) may be suitable for use in the present invention. Biphenyl compounds are generally not suitable for use in the present invention unless they have a molecular weight less than about 205 grams/mole and do not exhibit a liquid crystalline phase at any temperature. It is well within the abilities of a skilled chemist to empirically determine which aromatic and heterocyclic compounds are suitable for use in the present invention by using these compounds in place of the benzene ring in accordance with formula I, adding the resultant material to a chiral nematic component and observing whether the material is soluble and lowers the viscosity of the material according to the present invention.

The following is a list of definitions of terms used in this disclosure:

"Heteroatom" is a nitrogen, sulfur or oxygen atom. The heteroatoms of groups that contain more than one heteroatom may be the same or different.

"Alkyl" is an unsubstituted or substituted saturated hydrocarbon chain radical. Preferred alkyl groups have from 1 to 11 carbon atoms ("lower alkyls") and include (for example) methyl, ethyl, propyl, butyl, pentyl and heptyl.

"Cycloalkyl" is a saturated hydrocarbon ring radical. One preferred cycloalkyl is cyclohexyl.

"Heterocyclic ring" is an unsubstituted or substituted, aromtic ring radical comprised of carbon atoms and one or more heteroatoms in the ring. The aromatic compounds of the invention, including any heterocyclic compounds, are preferably monocyclic.

"Alkoxy" is an oxygen radical having a hydrocarbon chain substituent, where the hydrocarbon chain is an alkyl or alkenyl (i.e., —O-alkyl or —O-alkenyl).

As defined above and as used herein, substituent groups may themselves be substituted. Substituents that may be suitable for use in the present invention are listed in C. Hansch and A. Leo, *Substituent Constants for Correlation Analysis in Chemistry and Biology* (1979), which is incorporated herein by reference.

The present invention provides numerous advantages. The second component of the present invention substantially lowers the bulk viscosity of the chiral nematic liquid crystal material. This is achieved in the complex chiral system using the particular second components in specific amounts. That is, the second components for lowering viscosity must be soluble in the chiral nematic component and have a small size (e.g., a molecular weight not greater than 205 grams/mol). All of the liquid crystal materials must not exhibit a liquid crystalline phase at any temperature.

In addition to the second component producing substantial reductions in the viscosity of the liquid crystal material, the invention also relates to display devices that exhibit dramatically improved properties. For instance, the contrast was improved greatly compared to compositions without the second component. This is believed to be due to a novel morphology of the composition involving changes in planar and focal conic domains and in the defect structures between domains. One effect of this morphology is that the focal conic state exhibits reduced scattering by at least about 40% compared to a composition without the second component.

The present method of reducing switching times, by cooperating the liquid crystal material with the cell wall structure, results in an improved switching speed. That is, the second component is used in an amount effective to transform the liquid crystal material to the homeotropic state with a pulse width $PW_{imp}$ that is reduced about 50% from a conventional pulse width. This improvement is obtained when the amount of the second component is greater than 8% by weight and, in particular, at least about 10% by weight. The invention thus results in a chiral nematic liquid crystal material having greatly reduced viscosity, and in a method and display device using this composition that benefit from improved properties including reduced voltages, shorter pulse times and increased contrast.

Many additional features, advantages and a fuller understanding of the invention will be had from the accompanying drawings and the detailed description that follows.

DETAILED DESCRIPTION OF PREFERRED EMBODIMENTS

The present invention is directed to a liquid crystal material for a display device including a first chiral nematic liquid crystal component and a second component or additive for lowering the viscosity of the material. The liquid crystal material of the present invention has positive dielectric anisotropy. The viscosity lowering additive is achiral and is characterized by its low molecular weight and by its ability to exhibit no liquid crystalline phase at any temperature.

The viscosity lowering additive of the present invention comprises either of the following general formulas I or II. Formula I is directed to viscosity lowering additives in the form of the following substituted phenyl compounds:

I.

wherein
group $R_1$ is selected from the group consisting of an alkyl group and an alkoxy group having from 1 to 9 carbon atoms; and
group A is an optional group that comprises any group that renders the second component polar and soluble in the chiral nematic liquid crystal component.

Formula II is directed to viscosity lowering additives in the form of the following polar compounds:

II.

wherein
group $R_2$ comprises an alkyl or alkoxy group having from 1 to 11 carbon atoms and group B comprises any group that renders the second component polar and soluble in the first chiral nematic liquid crystal component.

A viscosity lowering additive is soluble as defined herein if, in a mixture of the additive and chiral nematic liquid crystal material which is filled into a cell, no separation of the additive is visible to the naked eye. A viscosity lowering additive is polar as defined herein if the center of negative charge of the molecule does not coincide with the center of positive charge of the molecule. The polarity relates to the dipole moment of the molecule, as calculated by $\mu=ed$, wherein A is the dipole moment of the molecule, e is charge and d is the distance of separation between charges.

In preferred form, $R_1$ and A are located at the para position on the benzene ring in formula I. $R_1$ and A may be located at the meta postion on the benzene ring if the resultant material is soluble in the chiral nematic liquid crystal component. Each of groups A and B may be a lower alkyl or alkoxy group or a cyano group, and is preferably a cyano group. All of the alkyl and alkoxy groups of formulas I and II are preferably straight chain groups but may also be branched or cyclic. $R_1$ may comprise a cyclic alkyl or alkoxy group having from 3 to 6 carbon atoms.

An odd number of carbon atoms is preferable in the alkyl and alkoxy groups of formulas I and II. This is because using an odd number of carbon atoms in these groups may lower the nematic-isotropic phase transition temperature less than when an even number of carbon atoms is used. The viscosity lowering additives of formula I may be either polar or non polar.

The viscosity lowering additives of formulas I and II may include other substituents on the alkyl group, the alkoxy group and on the benzene ring, as long as the substituents result in a viscosity lowering additive that is soluble and lowers the viscosity of the material according to the present invention. In this regard, some substituents that may be suitable for use in the present invention include Cl, F, $OCF_3$, $NO_2$ and OCHF.

Preferred substituted phenyl compounds that satisfy the general formula I are as follows: 1-phenylpentane, 1-phenylhexane, 1-cyclohexylbenzene, p-cyanopentylbenzene, 4-phenylbutyronitrile and p-cyanophenylheptane. These compounds are shown by the following formulas Ia–f. A preferred additive having a formula that satisfies formula II is undecyl cyanide, which is shown by the following formula IIg. The compounds Ia–f and IIg may include substituents such as those discussed above.

Ia.

Ib.

Ic.

Id.

Ie.

If.

IIg.

The following Table 1 provides information as to the viscosity lowering additives of the present invention.

TABLE 1

| Additive | MP[1]/BP/P (° C./° C./ mm Hg) | MW[2] (g/mol) | Polarity |
|---|---|---|---|
| p-cyanopentylbenzene | —/93/100 | 173.26 | polar |
| 1-phenylhexane | −61/226/— | 162.28 | non-polar |
| 1-cyclohexylbenzene | 5/239/— | 160.26 | non-polar |
| 1-phenylpentane | −75/205/— | 148.25 | non-polar |
| undecyl cyanide | —/198/100 | 181.32 | polar |
| 4-phenylbutyronitrile | 99/97/1.7 | 147.22 | polar |
| p-cyanophenylheptane | —/118/1.0–1.6 | 202.32 | polar |

[1]Melting Point/Boiling Point/Pressure (at atmospheric pressure unless otherwise indicated)
[2]Molecular Weight The viscosity lowering additives of the present invention are relatively small in size compared to the size of the chiral nematic component, and have a molecular weight not greater than about 205 grams/mole. Even more preferably, the additives of the present invention have a molecular weight ranging from about 140 to about 205 grams/mole. It is preferred that the additives of formula I include only one benzene ring.

In general, the liquid crystal material of the present invention comprises:

a chiral nematic material in an amount up to about 90%;
a nematic material in an amount ranging from 0 to about 52%;
a viscosity lowering material in an amount ranging from about 5% to about 20%;
a dye in an amount ranging from 0 to about 2%;
a monomer in an amount ranging from 0 to about 1.2%; and
a photoinitiator ranging from 0 to about 0.3%.

In preferred form, the chiral nematic material is present in an amount ranging from about 48% to about 90%. The chiral nematic material may comprise, for example, one or more of the following materials obtained from Merck Ltd.: BL061, BL100, and BL036. Many other chiral nematic materials may also be suitable for use in the present invention as would be appreciated by those skilled in the art.

The pitch length of the liquid crystal materials of the invention are adjusted based upon the following equation (1):

$$\lambda_{max} = n_{av} p_0 \quad (1)$$

where $\lambda_{max}$ is the peak reflection wavelength (wavelength at which reflectance is a maximum), $n_{av}$ is the average index of refraction of the liquid crystal material, and $p_0$ is the natural pitch length of the cholesteric helix.

Definitions of cholesteric helix and pitch length and methods of its measurement, are known to those skilled in the art such as can be found in the book, Blinov, L. M., *Electro-optical and Magneto-Optical Properties of Liquid Crystals*, John Wiley & Sons Ltd. 1983. The pitch length is modified by adjusting the concentration of the chiral material in the liquid crystal material. For most concentrations of chiral dopants, the pitch length induced by the dopant is inversely proportional to the concentration of the dopant. The proportionality constant is given by the following equation (2):

$$p_0 = 1/(HTP \cdot c) \quad (2)$$

where c is the concentration in % by weight of the chiral dopant and HTP is the proportionality constant.

The nematic material is used to adjust the concentration of the chiral nematic material and thus, the pitch length of the liquid crystal. The amount of nematic material that is added to, for example, the BL474 061 chiral nematic material, depends upon the desired wavelength of radiation that is to be reflected by the liquid crystal material. For example, little or no E44 needs to be used to produce a display that reflects light having a short wavelength, e.g., blue. About 52% of E44 is used to produce a display that reflects radiation having a wavelength in the infrared wavelength range of the electromagnetic spectrum. The present material may be used in display devices disclosed in patent application Ser. No. 08/823,329 now abandoned, entitled "Display Device Reflecting Visible and Infrared Radiation," which is incorporated herein by reference in its entirety.

The amount of nematic liquid crystal material to be added to the chiral nematic material to adjust the pitch length to produce a material reflecting radiation having various wavelengths, would be apparent to those skilled in the art in view of this disclosure. It would also be apparent to those skilled in the art that instead of adjusting the pitch length of the material by adding the nematic material to the chiral nematic material, a material having the desired pitch length may be produced by adding a chiral dopant to a major amount of a nematic material.

The nematic material may comprise, for example, one or more of the following materials obtained from Merck Ltd.: E44, BL101, E7, ZLI-3308, ZLI-3273, ZLI-5048-000, ZLI-5049-100, ZLI-5100-100, ZLI-5800-000 and MLC-6041-100. Other nematic materials may also be suitable for use in the present invention as would be appreciated by those skilled in the art.

The following viscosity lowering additives of the present invention were obtained from the Aldrich Chemical Company: 1-phenylpentane, 1-phenylhexane, 1-cyclohexylbenzene, 4-phenylbutyronitrile and undecyl cyanide. The viscosity lowering additives, p-cyanopentylbenzene and p-cyanophenylheptane, were synthesized by Kent State University according to the following steps 1–4.

Where R = $C_5H_{11}$, $C_7H_{15}$

The acid chlorides 1 were obtained from the Aldrich Chemical Company and mixed with ammonium hydroxide 2 to produce the amides b.The amides 3 were dehydrated using phosphorus oxychloride to obtain either 4, p-cyanopentylbenzene or p-cyanophenylheptane, where R is $C_5H_{11}$ and $C_7H_{15}$, respectively. The products 4 were purified by distillation.

The viscosity lowering additive is present in an amount ranging from about 5 to about 20 % by weight based on the total weight of the material. An upper limit of the amount of the additive is that it must be soluble in a chiral nematic liquid crystal when filled in a cell. The viscosity lowering additive is preferably present in an amount that is greater than 8% and, even more preferably, in an amount ranging from at least about 10% to about 15%.

Properties of the liquid crystal display (e.g., contrast ratio, voltage, switching times, relaxation times from homeotropic to planar states) tend to improve with increasing amount of additive. For example, a material comprising 5% of the p-cyanopentylbenzene additive, results in a display with a contrast ratio of about 30:1 at a voltage $V_4$ (voltage needed to transform the material from the focal conic to the homeotropic state) of about 38 volts and a relaxation time of 150 milliseconds. A display incorporating 10% of this additive exhibits a contrast ratio of about 40:1, a voltage $V_4$ of 34 volts and a relaxation time of 110 milliseconds.

A dye in an amount ranging from about 0.25% to about 1.5% may also be used. Any suitable dye may be used in the present invention, for example, 4-hexylamino-4'-nitroazobenzene (C6) prepared by Kent State University.

The bistability of the liquid crystal material may be obtained using a polymer network or surface treatment, but requires neither. The polymer stabilized cholesteric texture (PSCT) displays employ substrates having surface treatment that promotes homogeneous alignment, with the liquid crystal material including small amounts of monomer and photoinitiator. For a description of suitable polymer stabilized materials and their cell fabrication, refer to Doane, J. W., Yang, D. K., *Front-lit Flat Panel Display from Polymer Stabilized Cholesteric Textures*, Japan Display 92, Hiroshima October 1992; Yang, D. K. and Doane, J. W., *Cholesteric Liquid Crystal/ Polymer Gel Dispersion: Reflective Display Application*, SID Technical Paper Digest, Vol XXIII, May 1992, p. 759, et seq., as well as to U.S. Pat. Nos.: 5,570,216, entitled "Bistable Cholesteric Liquid Crystal Displays with Very High Contrast and Excellent Mechanical Stability;" 5,251,048, entitled "Method and Apparatus for Electronic Switching of a Reflective Cholesteric Display" and 5,384,067, entitled "Gray Scale Liquid Crystal Material," all of which are incorporated herein by reference in their entireties.

An example of a preferred polymer stabilized material includes the amounts of chiral nematic material, nematic material and viscosity lowering additive referred to above, and also includes a monomer in an amount ranging from about 1.0% to about 1.2% and a photoinitiator in an amount ranging from about 0.25% to about 0.3%. The amounts of the other components are decreased by an overall amount of about 1.5% when the monomer and photoinitiator are used. The monomer preferably comprises 4,4'-bisacryloylbiphenyl ("BAB") synthesized by Kent State University. The photoinitiator may comprise IRGACURE® 369 and 651 brand photoinitiators, which may be obtained from Ciba-Geigy Corp.

Regarding the polymer free materials, in some instances it is desirable to treat the cell walls and the electrodes with materials, such as passivation and alignment layers. By passivation layer is meant an insulating layer that prevents front to back shorting of the electrodes. The conductive coating is preferably comprised of transparent indium tin oxide (ITO), however, any conductive coating having good optical transmission may be utilized, such as conductive polymers and tin oxide. One example of a suitable passivation material is a SiTi material known as NHC-720A, which is manufactured by Nissan Chemical. One example of a suitable alignment material is No. SE-7511L manufactured by Nissan Chemical. The passivation layer has a thickness ranging from about 400 to about 1000 angstroms. The alignment layer has a thickness ranging from 0 to about 1000 angstroms. Detergents or chemicals may be used to treat the cell walls to obtain variations in the contrast or switching characteristics. These treatments can be used to affect the uniformity of the liquid crystal, to alter the stability of the various textures and to alter the strength of any surface anchoring. In addition to using a wide variety of materials for such surface treatments, the treatments on opposing substrates may differ. For example, the substrates may be rubbed in different directions, one substrate may include the treatment while the other may not, or opposite substrates may be used with different materials. As noted above, such treatments can have the effect of altering the effect of the cell response. The passivation layer or electrode material alone may sufficiently stabilize the focal conic texture. Optionally, other additives may be included in the chiral nematic liquid crystal mixture to alter the characteristics of the cell. For example, while color is introduced by the liquid crystal material itself, pleochroic dyes may be added to intensify or vary the color reflected by the cell. Similarly, additives such as fumed silica can be dissolved in the liquid crystal mixture to adjust the stability of the various cholesteric textures.

Figure 1:
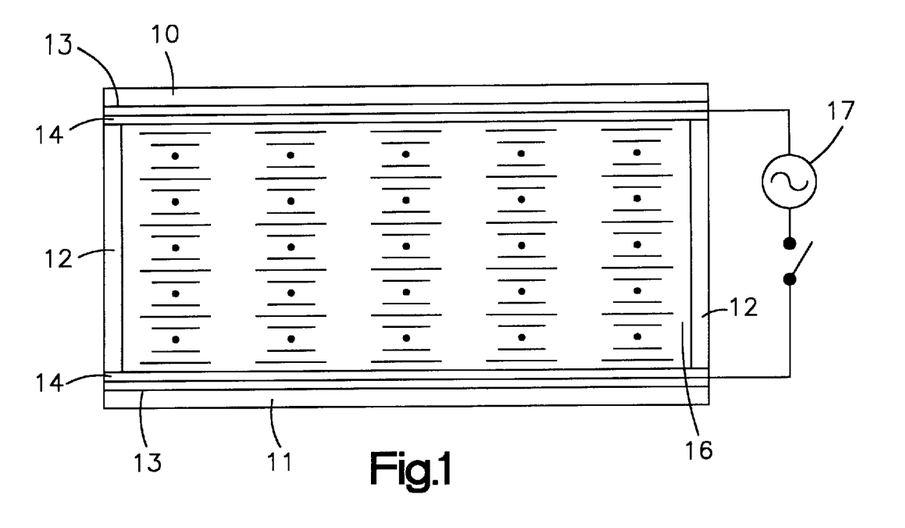
FIG. 1 is a diagrammatic view of a liquid crystal cell that may be used in connection with the present invention.

An example of a single cell display is shown in FIG. 1. The diagrammatically illustrated cell in FIG. 1 comprises glass substrates or plates 10, 11, which are sealed around their edges and separated by spacers 12. The glass plates are coated with indium tin oxide (ITO) or the like to form transparent electrodes 13. The reference character 14 represents an optional surface coating which can be applied to the electrodes to affect the liquid crystal director, or to alter the contrast, reflection or switching characteristics of the cell. The opposite coatings 14 may be the same material or a different material, and may be rubbed in different directions, or one or both of the coatings 14 may be eliminated altogether. The cell includes liquid crystal material 16 comprising the polymer free or PSCT materials.

It would be appreciated by those skilled in the art that the liquid crystal material of the present invention may be incorporated into types of cells other than shown and described herein. For example, instead of being addressed by externally activated electrodes, the material may be addressed by an active or passive matrix, a multiplexing scheme or other type of circuitry, all of which would be evident to those skilled in the art. Similarly, the cells can be prepared without the surface treatment layers 14.

The present invention may employ any suitable driving schemes and electronics known to those skilled in the art, including but not limited to that of the Doane and Yang articles referred to above as well as to the following, all of which are incorporated herein by reference in their. entireties: U.S. patent application Ser. No. 08/390,068 U.S. Pat. No. 5,748,277, filed Feb. 17, 1995, entitled "Dynamic Drive Method and Apparatus for a Bistable Liquid Crystal Display," U.S. provisional patent application filed May 12, 1997, entitled "Unipolar Waveform Drive Method and Apparatus for a Bistable Liquid Crystal Display," and U.S. Pat. No. 5,453,863, entitled "Multistable Chiral Nematic Displays." A passive matrix multiplexing type display is preferably used in the present invention. The effect that pulse amplitudes and widths, and speeds of field removal have on each texture is described in the 5,453,863 patent. The present invention may utilize the addressing techniques described in the 5,453,863 patent to effect gray scale.

The liquid crystal of the present invention is addressed by applying an electric field having a preferably square wave pulse of a desired width. The voltage may, for example, be an AC voltage having a frequency that may range from about 125 Hz to about 2 kHz. Various pulse widths may be used, such as a pulse width ranging from about 4 ms to about 50 ms.

It is to be understood that the voltages per micron of cell thickness necessary to drive the material between optical states may vary depending on the material, but that determination of necessary voltages is well within the skill in the art in view of this disclosure.

Displays comprising the material of the present invention have improved properties. One major improvement of the properties of displays made from the present liquid crystal material is contrast ratio. Contrast ratio is defined herein by dividing the following relationship (3) by the relationship (4):

(the intensity of reflected light in the twisted planar state at a peak wavelength minus background light) (3)

(the intensity of reflected light in the focal conic state at the peak wavelength of relationship minus background light) (4)

Contrast ratio is calculated herein by illuminating the cell, normal to its surface, with monochromatic light in a dark room. Light is detected at 45° with respect to the plane of the substrate. The contrast ratio may be about 17:1 for a conventional chiral nematic material. However, displays that employ materials of the present invention have a contrast ratio ranging from about 30:1 to about 45:1 or more, with a contrast ratio of at least about 40:1 being preferable.

The additives of the present invention provide liquid crystal materials with a significant reduction in viscosity. Measuring the viscosity of a cholesteric system is difficult in view of its complex helical nature. The process that was used to measure the viscosity of the chiral nematic liquid crystal material will be described. Cholesteric materials flow through a circular capillary opening like a plug. Helfrich. W., *Capillary Flow of Cholesteric and Smectic Liquid Crystals*, Phys. Rev. Lett. 23, 372 (1969). The total flow per second Q is given by the following equation (5):

$$Q=(P^2 A/(-\lambda_1)4\eta^2)p' \tag{5}$$

where P is the pitch of the helix, p' is the pressure gradient, A is the cross sectional area of the capillary tube and $\lambda_1 \leq 0$ is a constant. Poiseuille's law for circular capillaries is given by the following equation (6):

$$Q=(\pi a^4/8\eta)p' \tag{6}$$

where a is the radius and $\eta$ is the viscosity. Bulk viscosity can be expressed in terms of the kinematic viscosity $\nu$. The two viscosities are related to each other by the following relationship (7):

$$\nu=\eta/\rho \tag{7}$$

where $\rho$ is the density. The flow rate of the cholesteric liquid crystal is measured and is compared to the flow rate of a liquid of known viscosity and density. The ratio of the two fluids can be written as the following equation (8):

$$\eta_1/\eta_2=\rho_1 \cdot \tau_1 / \rho_2 \tau_2 \tag{8}$$

where $\tau_2$ and $\tau_2$ are the respective flow times. Equations (7) and (8) are reported by Pruecher, H. Jubb, R., and Finkenzeller, U., *Physical Properties of Liquid Crystals: Viscosities of Nematic Liquid Crystal Materials*, The Merck Group Liquid Crystal Newsletter, 8, 24 (1991). Rewriting equation (8) results in the following equation (9):

$$\eta_1/\rho_1=\eta_2 \cdot \tau_1/\rho_2 \tau_2 \tag{6}$$

Rewriting equation (9) in terms of the kinematic viscosity results in the following equation (10):

$$\nu_1=(\nu_2/\tau_2)\tau_1 \tag{9}$$

Equation (10) can be rewritten as the following equation (11):

$$\nu_1=K\tau_1 \tag{11}$$

where the following equation (12) has been used:

$$K=\nu_2/\tau_2 \tag{12}$$

Equation (11) relates the kinematic viscosity of the unknown liquid crystalline material to its flow rate through a capillary. The constant, K, is a known value for a standard liquid. Once the kinematic viscosity is known, the bulk viscosity can be obtained using equation (7), by measuring the density of the liquid crystal material.

The inside of a capillary tube was left untreated. The liquid crystal was homeotropically aligned so that the helical axes were substantially parallel to the long axis of the capillary. The tube was laid horizontally, eliminating the effect of gravity. The known fluid that was used was deionized water. The experiment was performed at 20° C.±1° C. Equations (11) and (12) can be rewritten according to the following equations (13) and (14):

$$K\nu\tau_{water}/\tau_{water} \tag{13}$$

$$\nu_{LC}=K\tau_{LC} \tag{14}$$

where LC means liquid crystal. Using the density of water at 20° C. and the flow rate, the calibration constant K is calculated as $1.901 \times 10^{-7}$ m$^2$.s$^{-2}$. By measuring the flow rates of the liquid crystal mixtures, kinematic viscosities may be calculated using equation (14). Bulk viscosities were calculated from the density. The densities of the liquid crystal were calculated by weighing a known volume of the material to within an error of ±0.01 ml.

Viscosities of some liquid crystal materials prepared according to the present invention are shown in the following Table 2. The bulk viscosity measurements are provided to within an error of ±2%.

TABLE 2

The bulk viscosity measurements are provided to within an error of ±2%.

| Liquid Crystal | Bulk Viscosity (cps) | Reduction in Viscosity Compared to Standard |
|---|---|---|
| Standard (BL061 + E44 + C6) | 151.0 | — |
| 5% p-cyanopentylbenzene | 103.6 | 31% |
| 8% p-cyanopentylbenzene | 80.7 | 47% |
| 10% p-cyanopentylbenzene | 79.1 | 48% |
| 5% 1-phenylhexane | 112.4 | 26% |
| 5% 1-cyclohexylbenzene | 108.9 | 28% |
| 10% 1-cyclohexylbenzene | 81.7 | 46% |

The reduction in bulk viscosity of about 48% for the 10% p-cyanopentylbenzene material was consistent with observed lower voltage levels, relaxation times and cell filling times. For example, cells were filled with the materials of the invention generally at least about 50% faster than were cells having a standard composition.

The present invention will now be described by reference to the following non-limiting examples.

EXAMPLE 1

The following materials were added together in % by weight based on the total weight of the composition.

| | |
|---|---|
| BL061 | 74.6% |
| E44 | 14.9% |
| p-cyanophenylpentane | 10.0% |
| C6 | 0.50%. |

The dye was added for color saturation. The cholesteric pitch was adjusted using the E44 nematic material to enable the material to reflect light having a wavelength in the visible range of the electromagnetic spectrum. The materials were mixed together on a vortex mixer for 30 seconds. The mixture was then placed in an oven at 100° C. until the entire mixture was in the isotropic phase. The mixture was then mixed on the vortex mixer at room temperature until the material returned to the cholesteric phase. The time of the second mixing varies depending upon the concentration of the additive and the quantity of the mixture.

EXAMPLE 2

The following components were added together and mixed under the same conditions as in Example 1.

| | |
|---|---|
| BL061 | 76.28% |
| E44 | 16.12% |
| 1-phenylhexane | 7.10% |
| C6 | 0.50%. |

EXAMPLE 3

The following components were added together and mixed under the same conditions as in Example 1.

| | |
|---|---|
| BL061 | 75.40%; |
| E44 | 16.10%; |
| p-cyanopentylbenzene | 8.00%; |
| BAB | 1.10%; |
| IRGACURE ® 651 | 0.30%; |
| C6 | 0.50%. |

EXAMPLE 4

The following mixture was prepared:

| | |
|---|---|
| BL061 | 74.6%; |
| E44 | 14.90%; |
| p-cyanopentylbenzene | 10.0%; |
| C6 | 0.50%. |

A standard cell composition was also prepared as follows:

| | |
|---|---|
| BL061 | 75.6%; |
| E44 | 23.9%; |
| C6 | 0.50%. |

Each of these materials was mixed according to the procedure discussed in Example 1. Glass substrates of the cell having passivation layers and ITO electrodes were obtained from Varitronix Ltd. The cells were separated by 5 μm spacers. Each glass substrate also included a high pretilt unrubbed polyimide alignment layer (SE7511 from Nissan) of about 100 Å in thickness. The cell was vacuum filled with the liquid crystal material and then plugged. The back of the cell was coated black. The data of FIGS. 2 and 3 was obtained using the cell prepared above.

Figure 2:
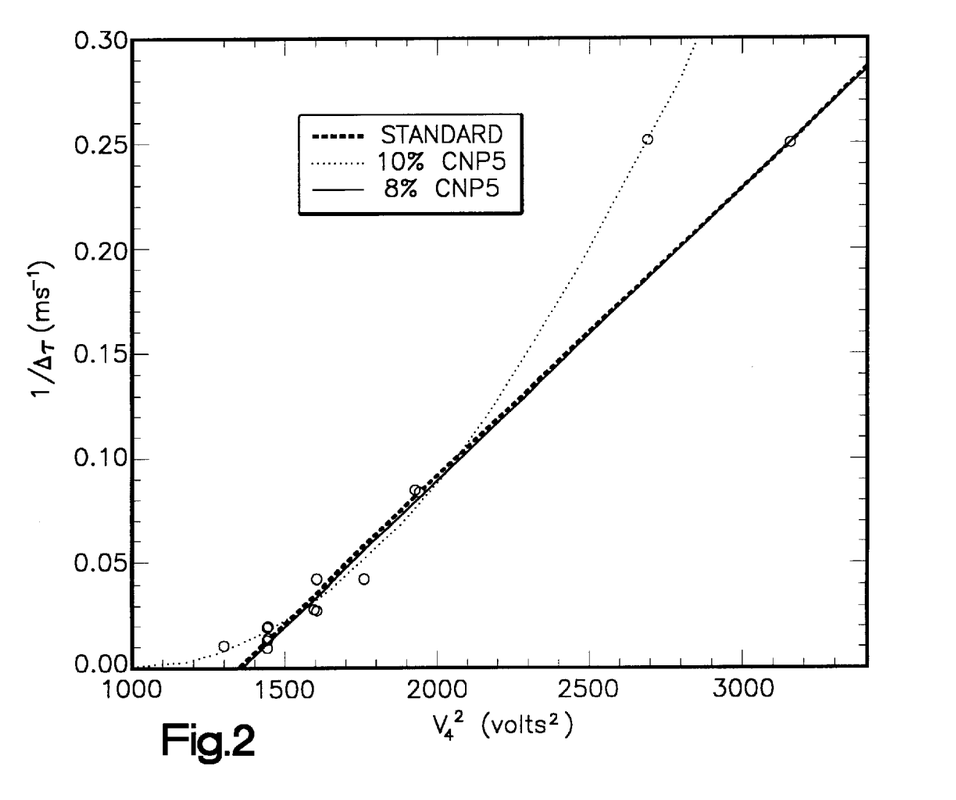
FIG. 2 is a graph showing inverse pulse width as a function of the square of voltage $V_4$ used to transform the material from the focal conic to the homeotropic state.

The data of FIG. 2 was acquired at room temperature. A voltage was applied for placing the material in the focal conic state and then, after a time (e.g., about 500 ms) a switching pulse was added in 2 volt increments. This transformed the material from the focal conic to the homeotropic state. As shown in FIG. 2, the relationship between the inverse pulse time $\Delta\tau$ versus $V_4^2$ is linear using 8% p-cyanophenylpentane (CNP5) but is nonlinear for the 10% CNP5 material. FIG. 2 indicates that the 10% CNP5 material requires a lower voltage and has a faster switching time (shorter pulse width) compared to the 8% CNP5 material. For example, for the 10% CNP5 material, at a switching time of about 4 milliseconds or $1/\Delta\tau = .25$, the value $V_4^2$ was about 2700. That is, the voltage $V_4$ was about 52 volts. In contrast, for the 8% CNP5 material at the same switching time, $V_4^2$ was about 3100 (the voltage $V_4$ being about 56 volts). The extent of the nonlinearity of the 10% p-cyanopentylbenzene curve increases with decreasing switching time (moving upward along the y axis). FIG. 2 shows that a pulse width of not greater than about 3 milliseconds can be obtained using a $V_4$ voltage that is less than 54 volts.

The present invention enables the use of square wave pulses having a pulse width in the range of 4–6 milliseconds and less to be used to transform the twisted planar and focal conic textures to the homeotropic state at a voltage not greater than about 45 volts. Compared to the standard material without the viscosity lowering additive, this is a reduction in pulse width of at least about 50%. The use of a 6 millisecond pulse width corresponds to a reduction in pulse width of at least 60% compared to the pulse width of the standard material. The use of a 4 millisecond pulse width corresponds to a reduction in pulse width of at least 70% compared to the pulse width of the standard material. FIG. 2 is provided for explaining the nonlinear behavior of the present 10% additive, not for showing optimal pulse widths and lowest voltages. For example, FIG. 2 was prepared using a 5 micron cell spacing and a single switching pulse to reach the homeotropic state. In contrast, cells may employ a 4.5 micron spacing and use multiple erase pulses to reach the focal conic state, which enables shorter pulse widths and lower voltages to be used.

FIG. 2 also shows that the linear relationship is dependant upon the concentration of the low viscosity material. In this regard, the invention preferably employs more than 8% additive and, even more preferably, at least about 10% additive. Using 8% of the CNP5 additive produces a line of constant slope, which is unremarkable in that it is very similar to the line obtained in the standard mixture using no additive. This line of constant slope for the material with 8% additive did not show the significant reduction in driving voltages and switching times obtained using more than 8% of additive.

While not wanting to be bound by theory, it is believed that the non-linear behavior of the material of the present invention in amounts greater than 8% is due to significant changes in the rotational viscosity $\gamma_1$, bulk viscosity $\eta$ and the twist elastic constant $K_{22}$. The rotational viscosity and twist elastic constant are difficult to measure in a chiral nematic system. Changes in the rotational viscosity and the twist elastic constant can significantly reduce applied voltages and switching times. In addition, it is believed that the lower bulk viscosity of the material may lower inter-domain and intra-domain energies. Inter-domain refers to the region between domains whereas intra-domain refers to the regions within individual domains. Lowering of these energies makes faster switching at lower voltages possible. This is because it is easier to break up the domains and reorient the liquid crystal from one texture to another when these energies are lower.

Figure 3:
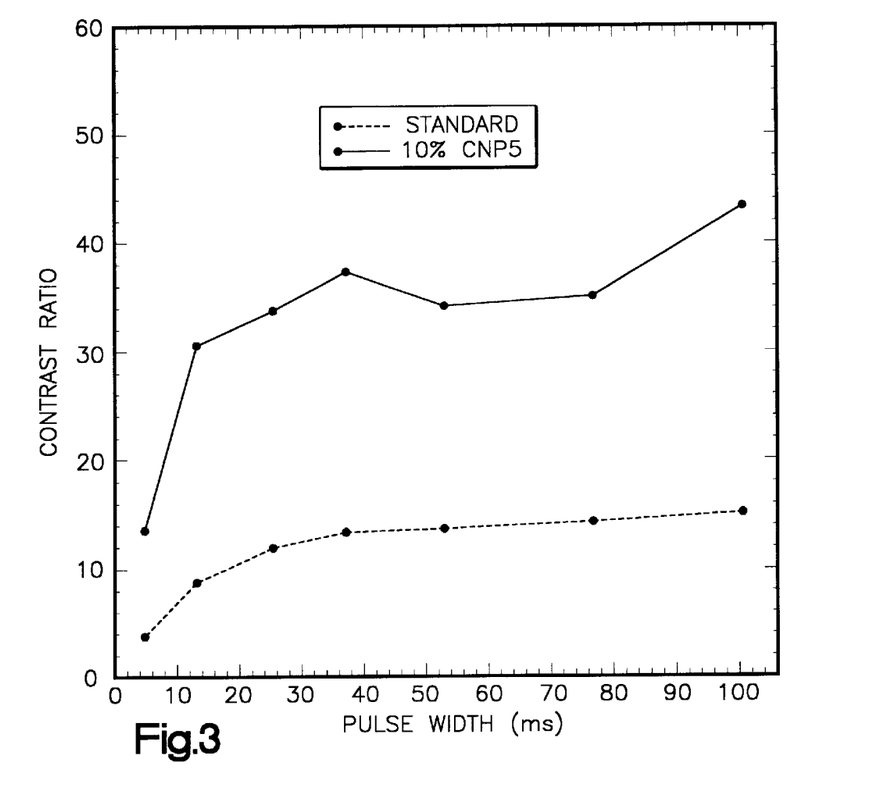
FIG. 3 is a graph showing the relationship of the contrast ratio as a function of pulse width.

FIG. 3 shows the relationship between contrast ratio as a function of pulse width at room temperature. The contrast ratio is calculated using formula (2) and (3) discussed above. At each pulse width, the intensity was measured after applying a voltage to transform the material from the focal conic to the planar state, and after applying a voltage to transform the material from the focal conic to the focal conic state. The low viscosity 10% p-cyanophenylpentane additive of the invention shows much better contrast than the standard material.

EXAMPLE 5

The following Table 3 shows the improvement in contrast and response time and peak wavelength shift for materials employing the viscosity lowering additive of the present invention.

TABLE 3

| Example[1] | % by weight | $\lambda_{peak}$ (nm) | Contrast Ratio | $t_{relax}$ (ms)[2] |
|---|---|---|---|---|
| Standard | 0 | 590 | 11.5:1 | 200 |
| COMP 2 | 5 | 582 | 19.9:1 | 140 |
| COMP 3 | 5 | 577 | 19.4:1 | 160 |
| COMP 4 | 10 | 572 | 29.1:1 | 100 |
| COMP 5 | 8 | 570 | 25.0:1 | 150 |

[1] In the above table the standard composition of Example 4 was used as the standard or as a base material in all of the samples. In composition 2 (COMP 2) the additive was cyclohexylbenzene and in COMP 3 and COMP 4 the additive was 1-phenylhexane. In COMP 5 the additive was cyanopentylbenzene.
[2] Time measured from homeotropic to planar state at 95% of full scale (entire scale including background).

When using the 8% p-cyanopentylbenzene material of composition 5, the peak reflection wavelength is between 572 nm and 576 nm in the temperature range of −20° C. to +40° C. The color shift is very minimal. The peak reflection wavelength rises after +40° C., which continues until the mixture goes to the isotropic phase.

While not wanting to be bound by theory, the following describes a novel mechanism believed to contribute to the improved properties of the material of the present invention. The present material exhibits improved planar and focal conic textures in view of altered inter-domain and intra-domain structures. The reflecting state is characterized by reflecting planar domains in which the liquid crystal helical axes are normal to the substrate. In the weakly scattering focal conic state, domains have liquid crystal helical axes generally randomly arranged with respect to the substrate. In both states the domains are separated by defect structures, which can be thought of as the walls between domains. The defect structures have helical liquid crystal axes at angles between the normal of and parallel to the substrate and thus, scatter light.

In the bright state, the low viscosity additives result in more abundant, larger reflecting planar domains as well as significantly smaller defects throughout the material. Since the defect structures are smaller, they result in less scattering. Also, the prevalence of larger reflecting planar domains provides the material with a greater intensity of reflected light, compared to a standard material. In addition, the larger planar domains are spaced uniformly throughout the material. As a result, the stability and wide viewing angle characteristics of the cholesteric liquid crystal display are advantageously maintained.

In the dark state, the present liquid crystal material exhibits larger focal conic (dark) domains as well as significantly less planar (bright) domains than without the additive. The larger focal conic domains result in less scattering than the standard material. This makes a more homogeneous material with a fewer number of mismatches in the refractive indices, therefore increasing the transparency of the focal conic state. The result is less scattering in the dark state and thus, a higher contrast ratio.

Figure 4:
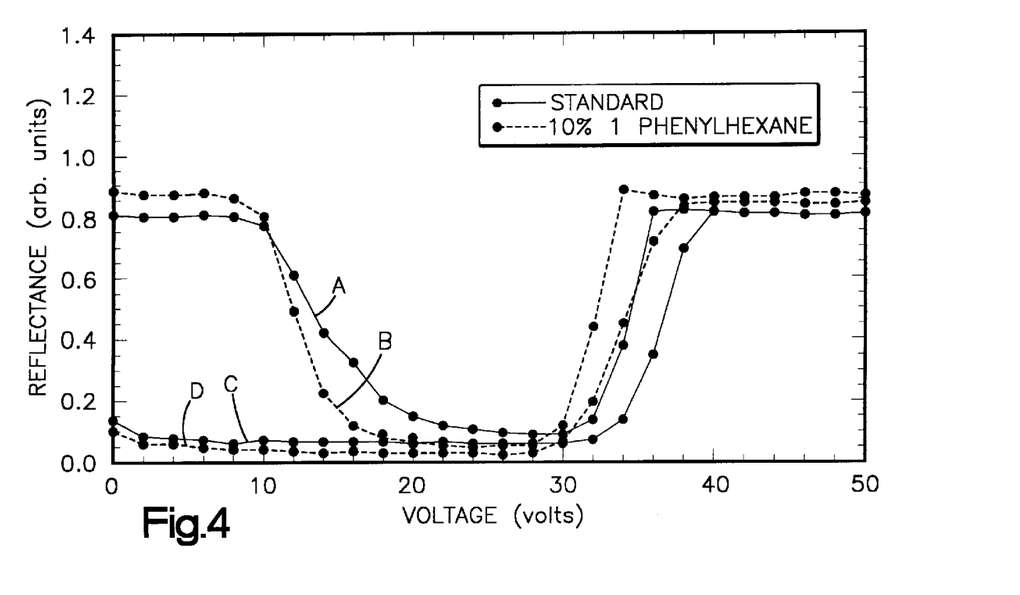
FIG. 4 is a graph showing reflectance as a function of voltage.

FIG. 4 shows the improvement of the focal conic state in the present invention for the standard material and the material including 10% 1-phenylhexane. Curves A and B show the transformation from the planar to the focal conic states for the standard material and the inventive material, respectively. Curves C and D show the transformation from the focal conic to the planar state for the standard and inventive materials, respectively. The curves were obtained using appropriate refreshing and switching pulses. Curves A and B were obtained by applying a refresh voltage (e.g., 50 volts) which ensures that the texture is planar. Then after a time, the switching voltages on the x-axis were applied in 2 volt increments with the reflectance being measured each time. Curves C and D were obtained in a similar manner, except that the refresh voltages ensured that the liquid crystal material was in the focal conic state ($V_3$ voltage) prior to applying the switching pulse.

Regarding the standard material, reflective curve A is not as transmissive as focal conic curve C. In contrast, using the present additive the reflective curve B has a transmission similar to that of the focal conic curve D. Moreover, the transmission of the focal conic states and reflectance of the planar states are improved using the inventive material compared to the standard material. FIG. 4 shows that radiation is reflected from the liquid crystal material in the focal conic state at an intensity that is at least about 40% less in the inventive material compared to the standard material. Therefore, the inventive liquid crystal material enables displays to have better contrast and allows faster multiplexing of high resolution displays.

Figure 5:
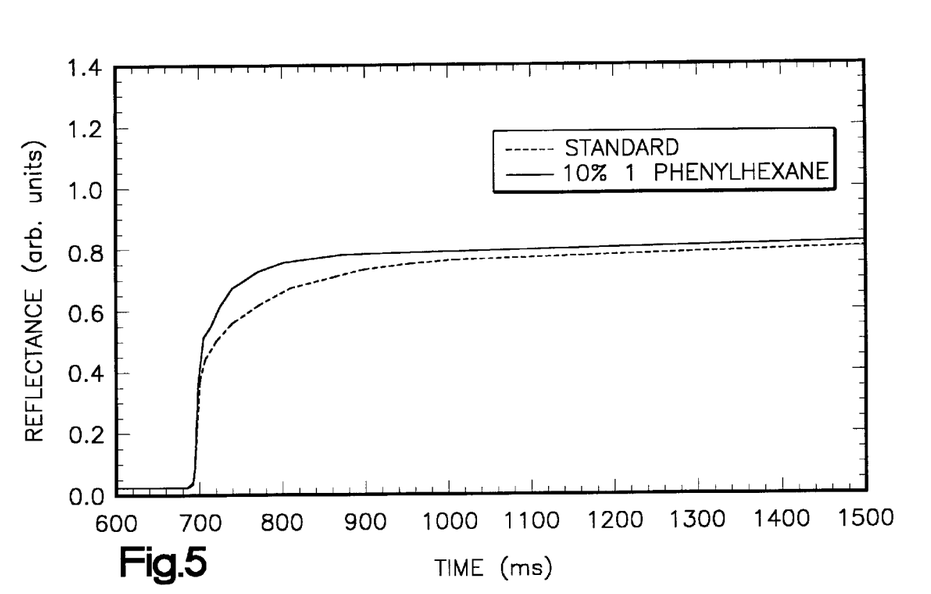
FIG. 5 is a graph showing the reflectance as a function of time.

FIG. 5 shows the relationship between reflectance and relaxation time for the standard and the 10% 1-phenylhexane material. The material in the homeotropic state was subjected to a 100 ms pulse. The time after the pulse was turned off for the material to change from the homeotropic, to the transient planar and to the planar textures, was then plotted. Due to the wavelength of light, the transient planar texture does not appear in FIG. 5. This Figure shows the inventive liquid crystal material reaches the reflecting planar state quicker and has a higher overall reflectance than the standard material without the additive.

EXAMPLE 6

The following mixture was prepared:

| | |
|---|---|
| BL061 | 75.22% |
| E44 | 16.28% |
| p-cyanophenylpentane | 8.0% |
| C6 | 0.50%. |

Figure 6:
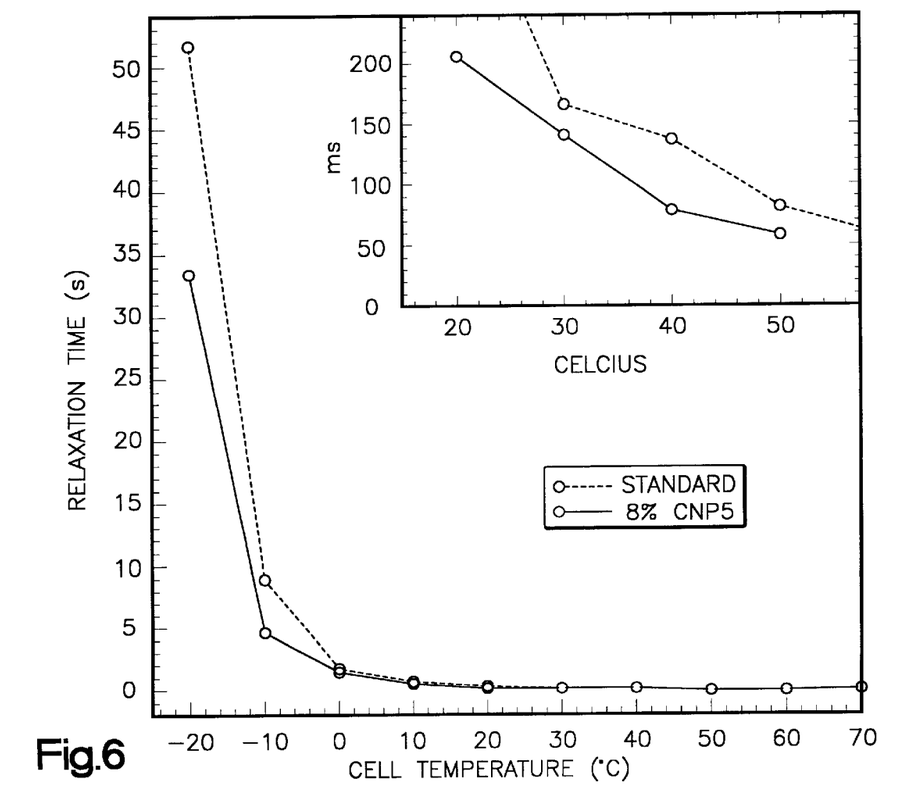
FIG. 6 is a graph showing the relaxation time as a function of cell temperature.
Figure 7:
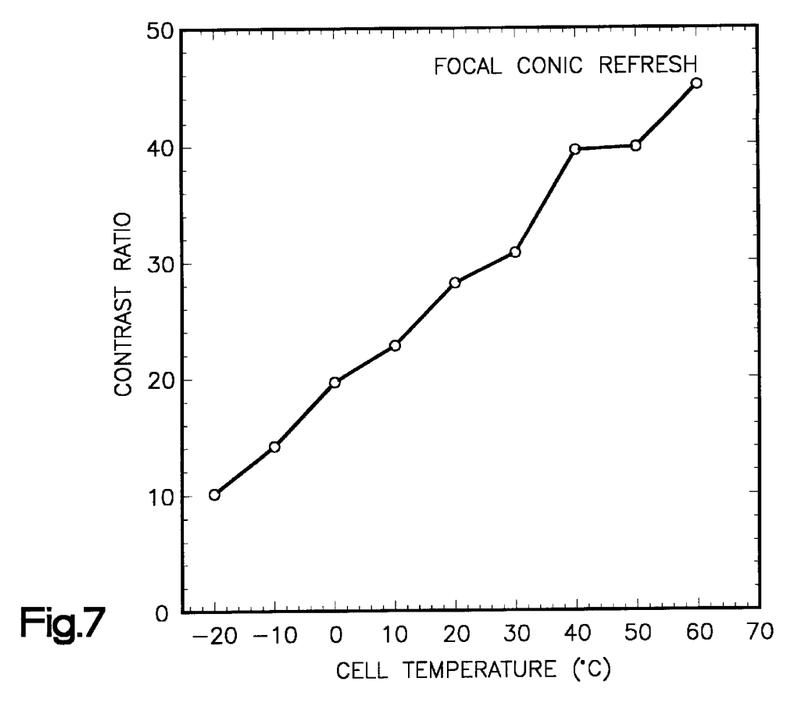
FIG. 7 is a graph showing contrast ratio as a function of cell temperature.
Figure 8:
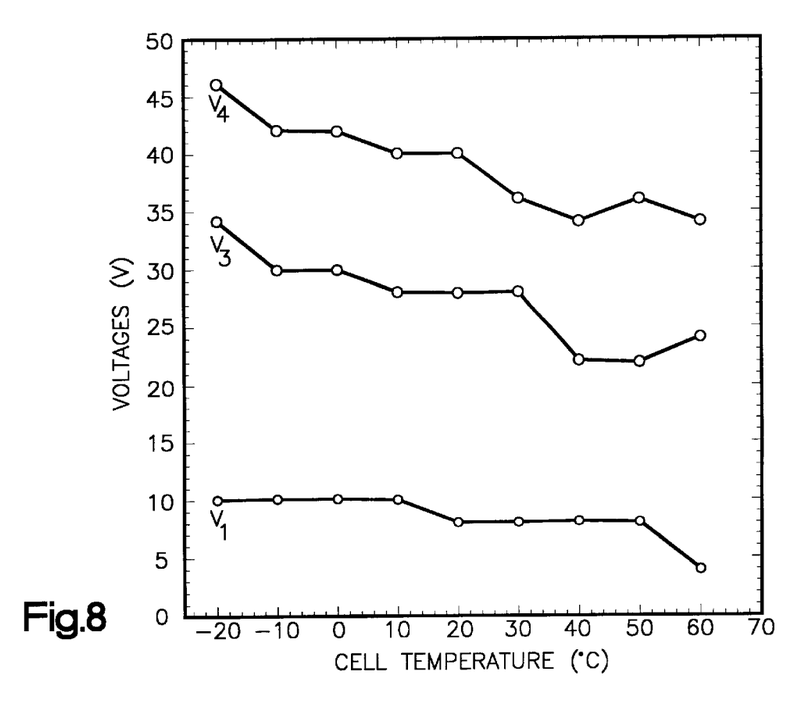
FIG. 8 is a graph showing voltages as a function of cell temperature.

A single pixel cell was prepared in accordance with the procedure described in Example 4. Experiments were conducted in the temperature range of −20° C. to 60° C., with the data points being at 10° intervals, to characterize the low and high end behavior of the material. The clearing point of the mixture was 63.0° C. The data of FIGS. 6, 7 and 8 was obtained using the cell prepared above. In FIGS. 6, 7 and 8 pulse widths were 100 ms above room temperature. Below room temperature, pulse widths were increased beyond saturation. The term saturation means having a pulse width that is long enough to ensure that the focal conic-to-homeotropic transition is in a steady state.

FIG. 6 shows the improvement in relaxation time (h-p) versus cell temperature. The relaxation time was measured by applying a pulse to drive the cell to the homeotropic state and then turning the voltage off relatively quickly as described in the 5,453,863 patent. The response time was measured as the reflectance coming back to 95% of full scale intensity. At −20° C. the relaxation time for the inventive liquid crystal material was about 34 seconds compared to a relaxation time of about 52 seconds for the standard mixture.

A graph of the contrast ratio versus temperature is shown in FIG. 7. The contrast was measured in the manner discussed with respect to FIG. 3. At −20° C. the lowest value for the contrast ratio was about 10:1. The contrast ratio increases at a slope that is significantly higher than that of the standard mixture, and is about 30:1 at room temperature. The maximum contrast ratio is about 45:1 near the clearing temperature of the mixture. The slope of the curve is significantly steeper than the standard mixture. The contrast is also higher at low temperatures than the standard mixture. The improved contrast ratio is largely due to the significantly less scattering focal conic state of the material of the present invention.

FIG. 8 shows the effect of cell temperature on voltages. $V_1$ is the minimum voltage needed to change some texture from the planar to the focal conic state. $V_3$ is the voltage needed to change the planar texture to the focal conic texture. The $V_3$ and $V_4$ curves shown in this Figure are not as linear as in the standard mixture. These curves stay closer together than the corresponding curves of the standard mixture down at lower temperatures. At −20° C. the difference between the $V_3$ and $V_4$ curves is 20 V for the present liquid crystal material compared to 16 V for the standard mixture. The voltages for the inventive material are also lower in general.

Many modifications and variations of the invention will be apparent to those of ordinary skill in the art in light of the foregoing disclosure. Therefore, it is to be understood that, within the scope of the appended claims, the invention can be practiced otherwise than has been specifically shown and described.

What is claimed is:

1. A low viscosity liquid crystal material for a display device comprising a first chiral nematic liquid crystal component and a second component for lowering the viscosity of said liquid crystal material, wherein said second component exhibits no liquid crystal phase at any temperature and comprises the following formula:

wherein $R_1$, is selected from the group consisting of an alkyl, a cycloalkyl directly bonded to the benzene ring, an alkoxy and a cyclic alkoxy group each having from 1 to 9 carbon atoms and A comprises any group that renders said second component polar and soluble in said first component.

2. The liquid crystal material of claim 1 wherein group A is selected from the group consisting of a cyano group and alkoxyl group.

3. A low viscosity liquid crystal material for a display device comprising a first chiral nematic liquid crystal component and a second component for lowering the viscosity of the liquid crystal material, said second component comprising:

wherein $R_2$ is selected from the group consisting of an alkyl, a cycloalkyl, an alkoxy and a cyclic alkoxy group each having from 1 to 11 carbon atoms.

4. The liquid crystal material of claim 3 wherein said second component comprises the following compound:

5. A low viscosity liquid crystal material for a display device comprising a first chiral nematic liquid crystal component and a second component that lowers the viscosity of said liquid crystal material, said second component being selected from the group consisting of:

6. A liquid crystal display device comprising:
a liquid crystal material comprising a first chiral nematic liquid crystal component and a second component that exhibits no liquid crystalline phase at any temperature, wherein said second component reduces the bulk viscosity of said liquid crystal material by at least about 26% at room temperature;
cell wall structure that cooperates with said liquid crystal material to form focal conic and twisted planar textures that are stable in the absence of a field; and means for applying an electric field to said liquid crystal material for transforming at least a portion of said first liquid crystal component to at least one of the focal conic and twisted planar textures, wherein said means for applying an electric field pulse can transform said liquid crystal material to a homeotropic state by applying a pulse of a width less than about 6 milliseconds and a voltage not greater than about 45 volts.

7. In a method of addressing a liquid crystal display device of the type comprising a chiral nematic liquid crystal material cooperating with cell wall structure to form focal conic and twisted planar textures that are stable in the absence of a field, which method comprises applying a pulse of a width $PW_{std}$ and a voltage effective to transform the liquid crystal material to a homeotropic state, the improvement comprising a method of increasing switching speed comprising cooperating said wall structure with a liquid crystal material comprising a first chiral nematic liquid crystal component and a second component, said second component exhibiting no liquid crystalline phase at any temperature, wherein said liquid crystal material comprises said second component in an amount effective to transform the liquid crystal material to the homeotropic state with a pulse width $PW_{imp}$ that is at least about 50% less than said pulse width $PW_{std}$ at said voltage.

8. The method of claim 7 wherein said liquid crystal material comprises said second component in an amount greater than 8% by weight based upon the total weight of said liquid crystal material.

9. The method of claim 7 wherein said pulse width $PW_{imp}$ is at least about 70% less than said $PW_{std}$.

10. The method of claim 7 wherein said pulse width $PW_{imp}$ is not greater than about 6 milliseconds.

11. The method of claim 7 wherein said pulse width $PW_{imp}$ is not greater than about 4 milliseconds.

12. The method of claim 7 comprising applying at least one square wave AC voltage pulse.

13. The method of claim 7 wherein said voltage is not greater than about 45 volts.

14. The method of claim 7 wherein said second component has a molecular weight not exceeding 205 grams/mole.

15. The method of claim 7 wherein said second component is achiral.

16. The method of claim 7 wherein said second component comprises an aromatic compound bonded to at least one of an alkyl, a cycloalkyl, an alkoxy and a cyclic alkoxy group.

17. The method of claim 7 wherein said second component comprises at least one of an alkyl and an alkoxy group bonded to a group that renders said second component polar.

18. The method of claim 7 comprising reflecting radiation from said liquid crystal material in the focal conic state at an intensity that is at least about 40% less than an intensity of a chiral nematic liquid crystal material without said second component.

19. A liquid crystal display device comprising:
a liquid crystal material comprising a first chiral nematic liquid crystal component and a second component that substantially reduces the bulk viscosity of said liquid crystal material, wherein said second component is present in an amount of at least about 5% by weight based upon a total weight of said liquid crystal material, exhibits no liquid crystalline phase at any temperature, is achiral, has a molecular weight not exceeding 205 grams/mole, and comprises an aromatic compound bonded to a group $R_1$ and an optional cyano group in the para or meta position on the aromatic compound, said group $R_1$ being selected from the group consisting of an alkyl, cycoalkyl, alkoxy, and cyclic alkoxy group, with the proviso that said $R_1$ group is not bonded to a cyclic compound other than said aromatic compound;

cell wall structure that cooperates with said liquid crystal material to form focal conic and twisted planar textures that are stable in the absence of a field; and means for applying an electric field to said liquid crystal material for transforming at least a portion of said first liquid crystal component to at least one of the focal conic and twisted planar textures.

20. The display device of claim 19 wherein said second component reduces the bulk viscosity of said liquid crystal material by at least about 26% at room temperature.

21. The display device of claim 19 wherein said second component is present in an amount of at least about 10% by weight based upon the total weight of said liquid crystal material.

22. The display device of claim 6 wherein said display device exhibits at least a 74% increase in contrast compared to a contrast of a conventional display without said second component.

23. The display device of claim 6 wherein said display device exhibits at least a 160% increase in contrast compared to a contrast of a conventional display without said second component.

24. The display device of claim 6 wherein said display device exhibits at least a 247% increase in contrast compared to a contrast of a conventional display without said second component.

25. A low viscosity liquid crystal material for a display device comprising a first chiral nematic liquid crystal component and a second component that lowers the viscosity of said liquid crystal material, wherein said second component exhibits no liquid crystal phase at any temperature and comprises the following formula:

wherein $R_1$ is selected from the group consisting of an alkyl, a cycloalkyl directly bonded to the benzene ring, an alkoxy and a cyclic alkoxy group each having from 1 to 9 carbon atoms, said formula comprising an optional group A on the benzene ring in the meta or para position, wherein said group A is any group that renders said second component polar and soluble in said first component.

26. The liquid crystal material of claim 25 wherein $R_1$ has 5 carbon atoms.

27. The liquid crystal material of claim 25 wherein $R_1$ has 6 carbon atoms.

28. The liquid crystal material of claim 25 wherein $R_1$ is a cyclohexyl group.

29. A low viscosity liquid crystal material for a display device comprising a first chiral nematic liquid crystal component and a second component that lowers the viscosity of said liquid crystal material, wherein said second component comprises:

30. The liquid crystal material of claim 25 wherein $R_1$ is the only substituent on the benzene ring.

31. The liquid crystal material of claim 25 wherein said second component has a molecular weight not exceeding 205 grams/mole.

32. The liquid crystal material of claim 25 wherein said second component is achiral.

33. The liquid crystal material of claim 25 wherein $R_1$ is acyclic.

34. The liquid crystal material of claim 25 comprising said second component in an amount greater than 8% by weight based upon the total weight of said liquid crystal material.

35. A low viscosity liquid crystal material for a display device comprising a first chiral nematic liquid crystal component and a second component that lowers the viscosity of said liquid crystal material, wherein said second component exhibits no liquid crystal phase at any temperature and comprises the following formula:

wherein $R_1$ is selected from the group consisting of an alkyl, a cycloalkyl, an alkoxy and a cyclic alkoxy group each having from 1 to 9 carbon atoms.

36. The liquid crystal material of claim 35 wherein $R_1$ has 5 carbon atoms.

37. The liquid crystal material of claim 35 wherein $R_1$ is acyclic.

38. The liquid crystal material of claim 35 wherein said second component has a molecular weight not exceeding 205 grams/mole.

39. The liquid crystal material of claim 35 wherein said second component is achiral.

40. The liquid crystal material of claim 35 comprising said second component in an amount greater than 8% by weight based upon the total weight of said liquid crystal material.

41. A liquid crystal display device comprising:
a liquid crystal material comprising a first chiral nematic liquid crystal component and a second component that exhibits no liquid crystalline phase at any temperature, wherein said second component reduces the bulk viscosity of said liquid crystal material by at least about 26% at room temperature and comprises the following formula:

wherein $R_1$ is an alkyl, a cycloalkyl directly bonded to the benzene ring, an alkoxy or a cyclic alkoxy group each having from 1 to 9 carbon atoms, said formula comprising an optional group A in the meta or para position on the benzene ring wherein said group A is any group that renders said second component polar and soluble in said first component, cell wall structure that cooperates with said liquid crystal material to form focal conic and twisted planar textures that are stable in the absence of a field; and means for applying an electric field to said liquid crystal material for transforming at least a portion of said first liquid crystal component to at least one of said focal conic and twisted planar textures.

42. The liquid crystal material of claim 41 wherein $R_1$ has 5 or 6 carbon atoms.

43. The liquid crystal material of claim 41 wherein $R_1$ is a cyclohexyl group.

44. The liquid crystal material of claim 41 wherein $R_1$ is the only substituent on the benzene ring.

45. The liquid crystal material of claim 41 wherein said second component has a molecular weight not exceeding 205 grams/mole.

46. The liquid crystal material of claim 41 wherein said second component is achiral and exhibits no liquid crystalline phase at any temperature.

47. The liquid crystal material of claim 41 wherein $R_1$ is acylic.

48. The liquid crystal material of claim 41 comprising said second component in an amount greater than 8% by weight based upon the total weight of said liquid crystal material.

49. The liquid crystal material of claim 41 wherein said group A is a CN group in the para position on the benzene ring.

50. A liquid crystal display device comprising:
a liquid crystal material comprising a first chiral nematic liquid crystal component and a second component that exhibits no liquid crystalline phase at any temperature, wherein said second component reduces the bulk viscosity of said liquid crystal material by at least about 26% at room temperature and comprises:

cell wall structure that cooperates with said liquid crystal material to form focal conic and twisted planar textures that are stable in the absence of a field; and means for applying an electric field to said liquid crystal material for transforming a portion of said liquid crystal component to at least one of the focal conic and twisted planar textures.

51. A liquid crystal display device comprising:
a liquid crystal material comprising a first chiral nematic liquid crystal component and a second component that substantially reduces the bulk viscosity of said liquid crystal material, wherein said second component is present in an amount of at least about 5% by weight based upon a total weight of said liquid crystal material, exhibits no liquid crystalline phase at any temperature, is achiral, has a molecular weight not exceeding 205 grams/mole, and is selected from the group consisting of a compound of formula I and a compound of formula II:

I.

wherein R1 is selected from the group consisting of an alkyl group and an alkoxy group and having from 1 to 9 carbon atoms; and

R₂—B   II.

wherein $R_2$ is selected from the group consisting of an alkyl group and an alkoxy group each having from 1 to 11 carbon atoms and B comprises any group that renders said second component polar and soluble in said first component;

cell wall structure that cooperates with said liquid crystal material to form focal conic and twisted planar textures that are stable in the absence of a field; and means for applying an electric field to said liquid crystal material for transforming at least a portion of said first liquid crystal component to at least one of the focal conic and twisted planar textures.

52. The liquid crystal material of claim 51 wherein said group B is selected from the group consisting of a cyano group, and an alkoxy group.

53. A liquid crystal display device comprising:

a liquid crystal material comprising a first chiral nematic liquid crystal component and a second component that substantially reduces the bulk viscosity of said liquid crystal material, wherein said second component exhibits no liquid crystalline phase at any temperature, is achiral, has a molecular weight not exceeding 205 grams per mole, and comprises

R₂—CN wherein $R_2$ is selected from the group consisting of an alkyl, a cycloalkyl, an alkoxy and a cyclic alkoxy group each having from 1 to 11 carbon atoms;

cell wall structure that cooperates with said liquid crystal material to form focal conic and twisted planar textures that are stable in the absence of a field; and means for applying an electric field to said liquid crystal material for transforming at least a portion of said first liquid crystal component to at least one of the focal conic and twisted planar textures.

54. A low viscosity liquid crystal material for a display device comprising a first chiral nematic liquid crystal component and a second component that lowers the viscosity of said liquid crystal material, wherein said second component exhibits no liquid crystal phase at any temperature and comprises: a group $R_1$ bonded to an aromatic ring other than benzene, and an optional group A in the para or meta position on the aromatic ring, wherein said group A is any group that renders said second component polar and soluble in said first component, said group $R_1$ being selected from the group consisting of an alkyl, a cycloalkyl, an alkoxy and a cyclic alkoxy group each having from 1 to 9 carbon atoms.

55. A low viscosity liquid crystal material for a display device comprising a first chiral nematic liquid crystal component and a second component that lowers the viscosity of said liquid crystal material, wherein said second component exhibits no liquid crystal phase at any temperature and comprises: a group $R_1$ bonded to a heterocyclic ring, said ring containing one or more heteroatoms selected from the group consisting of nitrogen, sulfur and oxygen atoms, and combinations thereof, and an optional group A in the para or meta position on the heterocyclic ring, wherein said group A is any group that renders said second component polar and soluble in said first component, said group $R_1$ being selected from the group consisting of an alkyl, a cycloalkyl, an alkoxy and a cyclic alkoxy group each having from 1 to 9 carbon atoms.

56. The liquid crystal material of claim 1 wherein said second component is achiral.

* * * * *